(12) United States Patent
Sharron et al.

(10) Patent No.: US 9,933,112 B2
(45) Date of Patent: Apr. 3, 2018

(54) MOUNTING DEVICE

(71) Applicants: Matthew A. Sharron, Seymour, CT (US); Andrew Visinski, Seymour, CT (US); Josef Visinski, Shelton, CT (US); Dave Loeser, Trappe, MD (US); Darren Mellors, Orange, CT (US); Charles Allen Lafferty, Jr., Easton, MD (US)

(72) Inventors: Matthew A. Sharron, Seymour, CT (US); Andrew Visinski, Seymour, CT (US); Josef Visinski, Shelton, CT (US); Dave Loeser, Trappe, MD (US); Darren Mellors, Orange, CT (US); Charles Allen Lafferty, Jr., Easton, MD (US)

(*) Notice: Subject to any disclaimer, the term of this patent is extended or adjusted under 35 U.S.C. 154(b) by 0 days.

(21) Appl. No.: 14/996,466

(22) Filed: Jan. 15, 2016

(65) Prior Publication Data

US 2016/0208982 A1    Jul. 21, 2016

Related U.S. Application Data

(63) Continuation-in-part of application No. 14/722,401, filed on May 27, 2015.

(60) Provisional application No. 62/104,188, filed on Jan. 16, 2015.

(51) Int. Cl.
| | | |
|---|---|---|
| F16M 13/00 | (2006.01) |
| F16M 13/02 | (2006.01) |
| F16B 2/14 | (2006.01) |
| F16B 2/04 | (2006.01) |
| F16M 11/04 | (2006.01) |
| A42B 3/04 | (2006.01) |

(52) U.S. Cl.
CPC ............. *F16M 13/022* (2013.01); *F16B 2/04* (2013.01); *F16B 2/14* (2013.01); *F16M 11/041* (2013.01); *F16M 13/00* (2013.01); *A42B 3/04* (2013.01)

(58) Field of Classification Search
CPC .......................... F41G 11/004; F16M 13/022
USPC ...................................... 42/90, 124
See application file for complete search history.

(56) References Cited

U.S. PATENT DOCUMENTS

| | | | | |
|---|---|---|---|---|
| 3,559,940 A * | 2/1971 | Kruzell | ................. | F41G 11/003 248/222.41 |
| 4,324,125 A * | 4/1982 | Jarman | ................. | B21D 25/04 24/536 |
| 4,865,485 A * | 9/1989 | Finnefrock, Sr. | ... | B25B 23/0021 403/17 |
| 5,396,725 A * | 3/1995 | Talbot | ................. | F41G 11/003 42/127 |
| 6,042,076 A * | 3/2000 | Moreno | ................. | B60R 1/04 248/222.11 |

(Continued)

*Primary Examiner* — Reginald Tillman, Jr.
(74) *Attorney, Agent, or Firm* — Buckingham, Doolittle & Burroughs, LLC (57) ABSTRACT

An improved mounting device for enabling a user to quickly and securely attach and detach an accessory (e.g., a strobe, flashlight, camera, etc.) to an object. In a preferred embodiment of the present invention, the device comprises an upper portion, a lower portion, and at least one locking mechanism to enable a user to quickly removably attach the improved mounting device to an object. In a further preferred embodiment of the present invention, the device also comprises a side wedge and side wedge spring.

4 Claims, 10 Drawing Sheets

(56) References Cited

U.S. PATENT DOCUMENTS

| | | | | |
|---|---|---|---|---|
| 6,678,988 B1* | 1/2004 | Poff, Jr. | F41G 11/003 | 42/124 |
| 7,814,698 B2* | 10/2010 | Fluhr | F41G 1/02 | 42/111 |
| 8,240,075 B1* | 8/2012 | Mullin | F41G 11/003 | 42/119 |
| 8,393,105 B1* | 3/2013 | Thummel | F41G 11/003 | 42/127 |
| 9,267,753 B2* | 2/2016 | Dextraze | F41G 11/002 | |
| 2010/0043271 A1* | 2/2010 | Williams | F41G 11/003 | 42/124 |
| 2011/0047855 A1* | 3/2011 | Wong | F41G 11/002 | 42/124 |
| 2011/0099878 A1* | 5/2011 | Moody | F41A 23/08 | 42/90 |
| 2011/0138673 A1* | 6/2011 | Deros | F41G 11/003 | 42/90 |
| 2015/0075054 A1* | 3/2015 | Barger | F41G 11/003 | 42/90 |
| 2015/0316354 A1* | 11/2015 | Cheng | F41G 11/001 | 42/90 |
| 2016/0102946 A1* | 4/2016 | Sharron | F41G 11/003 | 42/90 |
| 2016/0202019 A1* | 7/2016 | Sharron | F41C 27/00 | 42/90 |

* cited by examiner

MOUNTING DEVICE

CROSS-REFERENCE

This application is a continuation in part of patent application Ser. No. 14/722,401 filed on May 27, 2015, which claims priority from Provisional Patent Application Ser. No. 62/104,188 filed on Jan. 16, 2015.

FIELD OF THE INVENTION

This invention relates to an improved mounting device for quick and easy attachment of an accessory (e.g., a strobe, flashlight, camera, etc.) to an object (e.g., helmets, bags, skateboards, skis, bicycles, clothing, parachute harnesses, vehicles, etc.).

BACKGROUND

Many individuals desire to mount one or more interchangeable accessories, such as a strobe, flashlight, camera, etc. onto an object such as helmets, bags, skateboards, skis, bicycles, clothing, parachute harnesses, vehicles, etc. Historically, this has been accomplished by fixedly mounting the accessory to the object. However, heretofore, the process of mounting such accessories to an object required the use of external tools, and has been both awkward and time-consuming.

Consequently, there is a long felt need in the art for a device that enables a user to quickly and securely attach/detach any accessory to just about any type of object imaginable. There is also a long felt need for a device that is capable of being locked/unlocked with a single hand. Finally, there is a long felt need for a device that accomplishes all of the forgoing objectives, and that is relatively inexpensive to manufacture and safe and easy to use.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed herein, in one aspect thereof, is a device for enabling a user to quickly and securely attach/detach almost any accessory (e.g., a strobe, flashlight, camera, etc.) to almost any type of object (e.g., helmets, bags, skateboards, skis, bicycles, clothing, parachute harnesses, vehicles, etc.). In a preferred embodiment of the present invention, the improved mounting device comprises an upper portion, a lower portion, and one or more locking mechanisms to enable a user to quickly and removably attach the improved mounting device to an object, as described more fully below. In a further preferred embodiment, the device further comprises a side wedge and spring, and each locking mechanism is comprised of a releasing pin, at least one spring and a wedge.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details.

Figure 1:
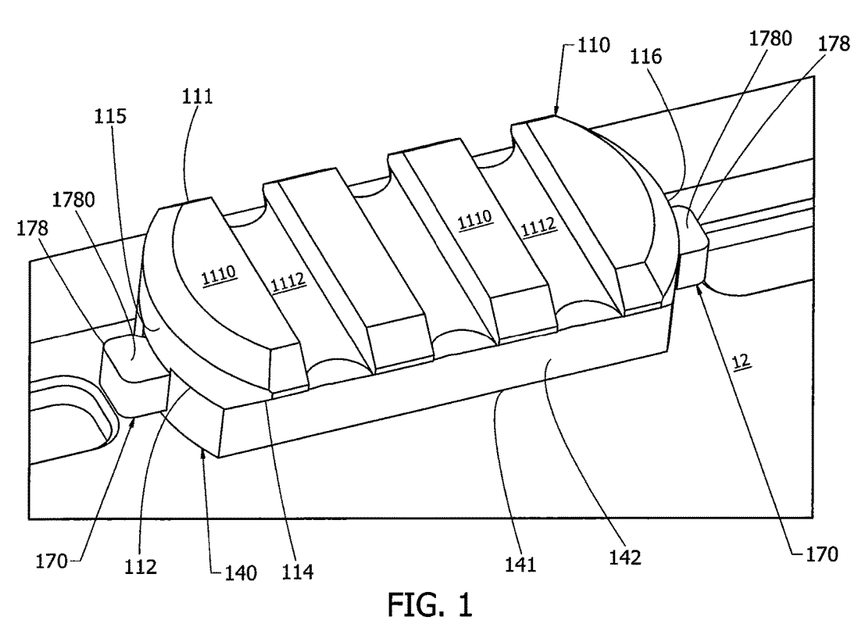
FIG. 1 is a perspective view of one embodiment of the device of the present invention securely attached to an object.

Referring initially to the drawings, FIG. 1 depicts a perspective view of one embodiment of the improved mounting device 100 of the present invention securely attached to an object. By way of background, object 10 can be almost any type of object (e.g., helmets, bags, skateboards, skis, bicycles, clothing, parachute harnesses, vehicles, etc.) that has an exterior surface 12, an interior surface 14 and a continuous opening 15 that extends between said exterior surface 12 and said interior surface 14.

The improved mounting device 100 of the present invention is preferably comprised of an upper portion 110, a lower portion 140 removably attached to said upper portion 110 through the use of fasteners 190 and a locking mechanism 170 for detachably securing device 100 to object 10 without the need for external tools. Except as otherwise stated herein, device 100 is preferably comprised of durable materials, such as metal, plastic, etc.

Figure 6:
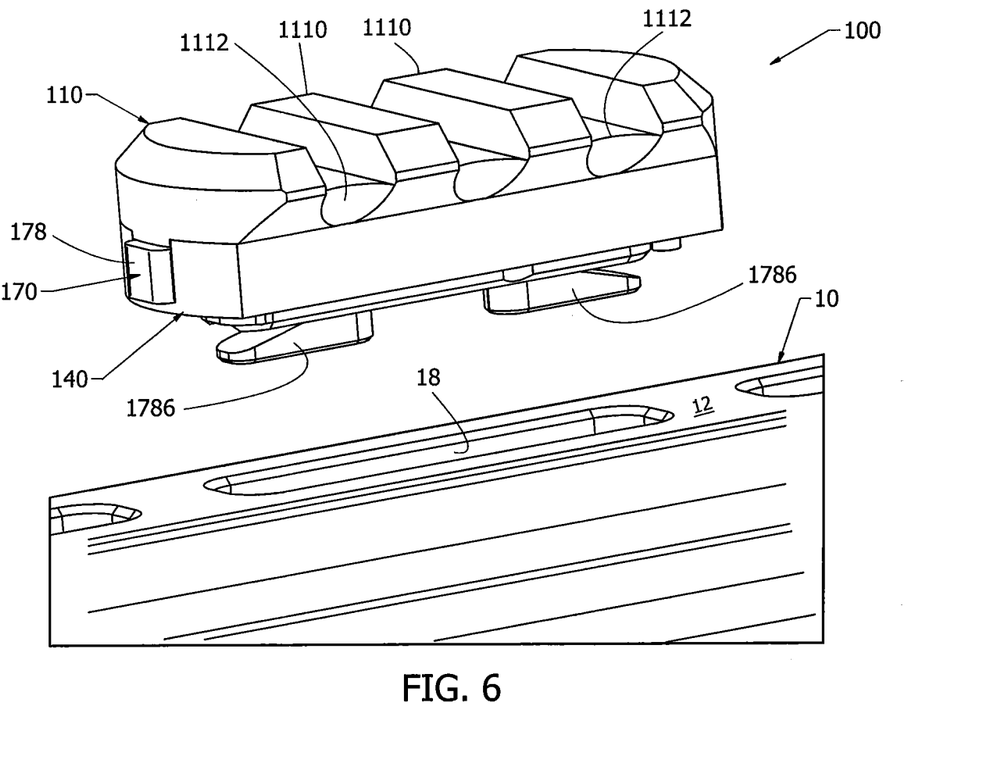
FIG. 6. is a side perspective view of one embodiment of the device of the present invention in an unlocked position, detached and spaced apart from an object.

As best illustrated in FIGS. 1 and 6, upper portion 110 is a generally elongated member that is comprised of a top 111, an opposing bottom 112, a pair of opposing side slots 114, a rear end 115 and a front end 116. Top 111 is also comprised of a plurality of raised spaced apart lugs or ridges 1110, with channels 1112 located between said ridges 1110 and formed by said ridges 1110. Opposing side slots 114 preferably extend between rear end 115 and front end 116 and are useful for attaching accessories (e.g., a strobe, flashlight, camera, etc.) to device 100. Bottom 112 may comprise a plurality of spaced apart threaded openings therein (not shown) for receipt of fasteners 190, which are used to fixedly attach upper portion 110 to lower portion 140 as described more fully below.

Figure 7A:
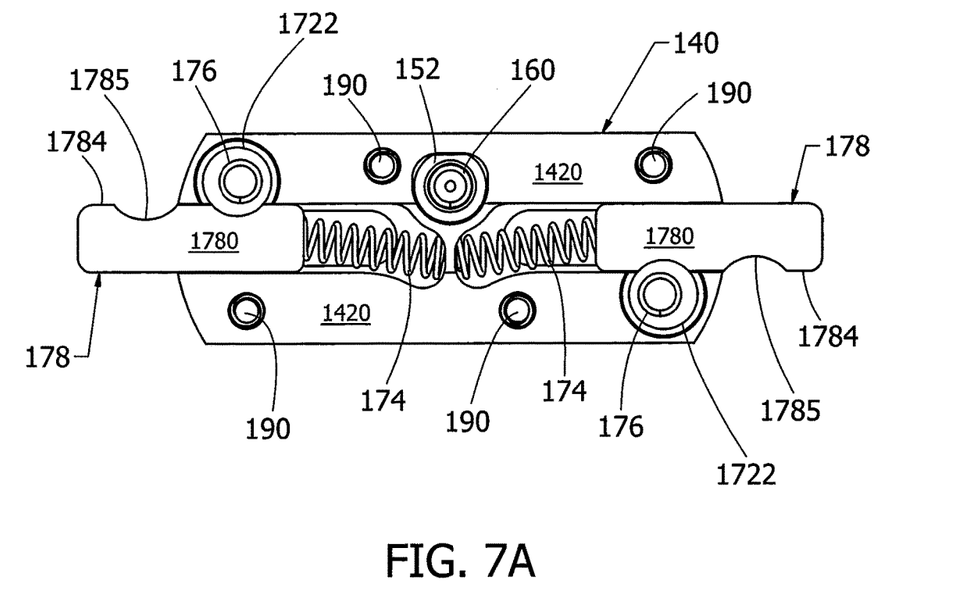
FIG. 7A is a top view of the lower portion of the device of FIG. 3 in a locked position.
Figure 7B:
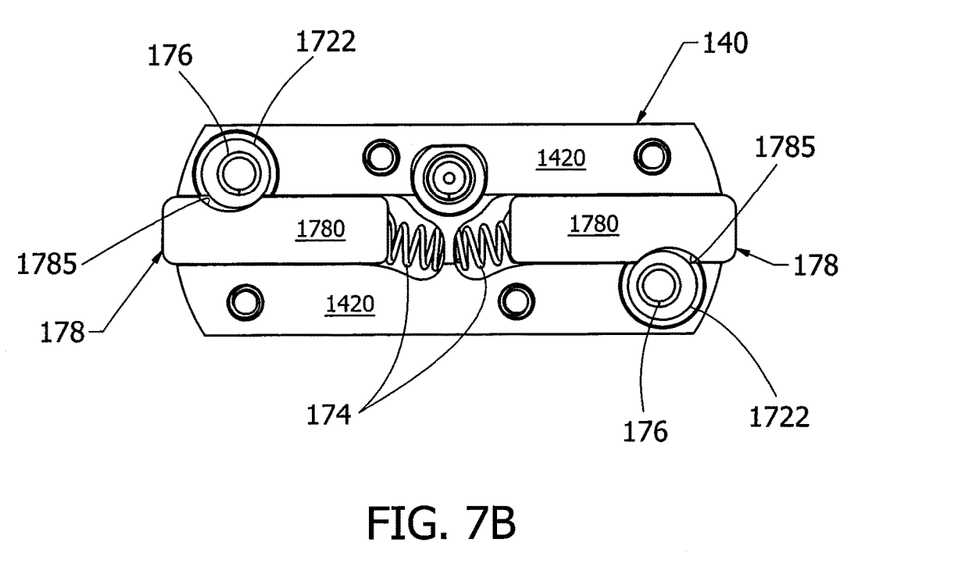
FIG. 7B is a top view of the lower portion of the device of FIG. 3 in an unlocked position.
Figure 8:
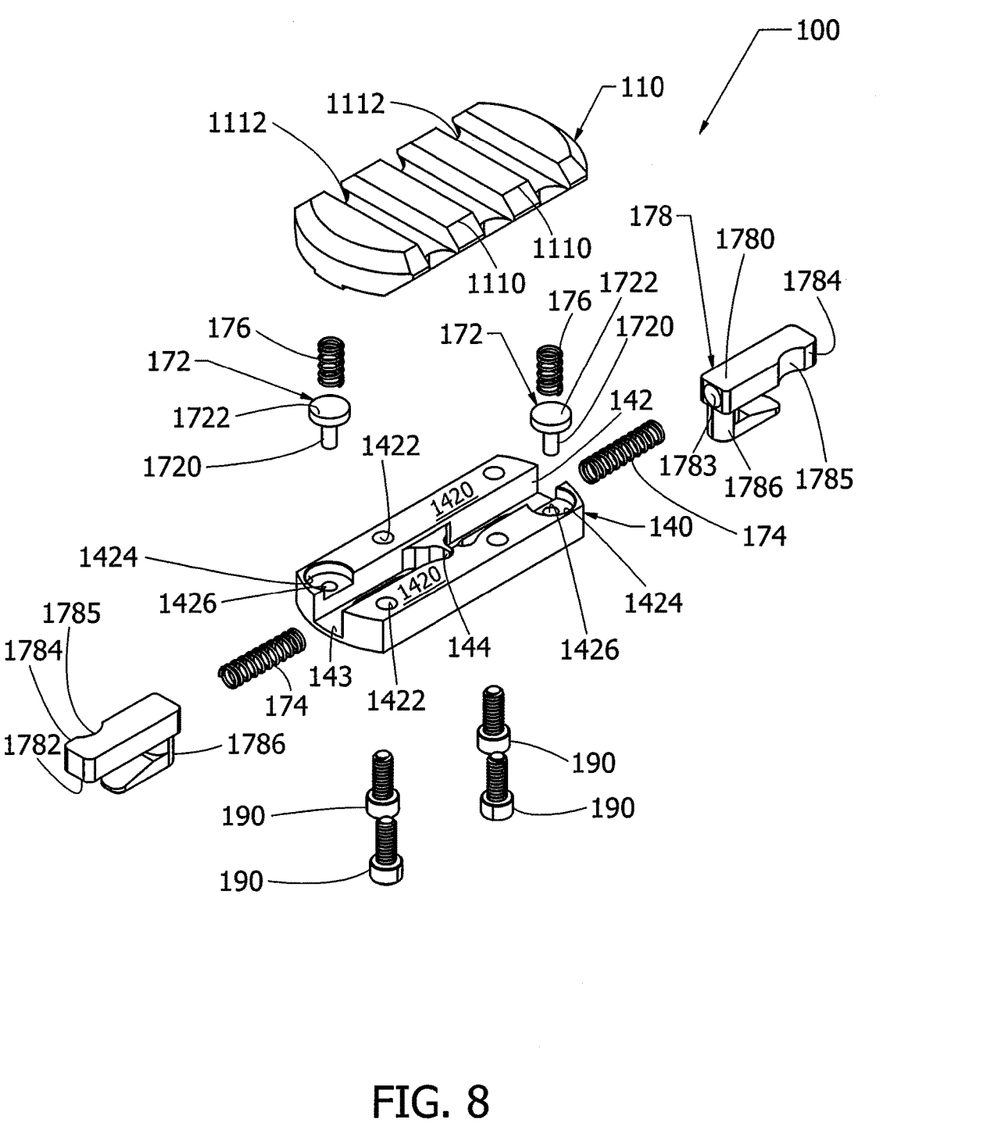
FIG. 8 is an exploded perspective view of the device of FIG. 2.
Figures 9A, 9B:
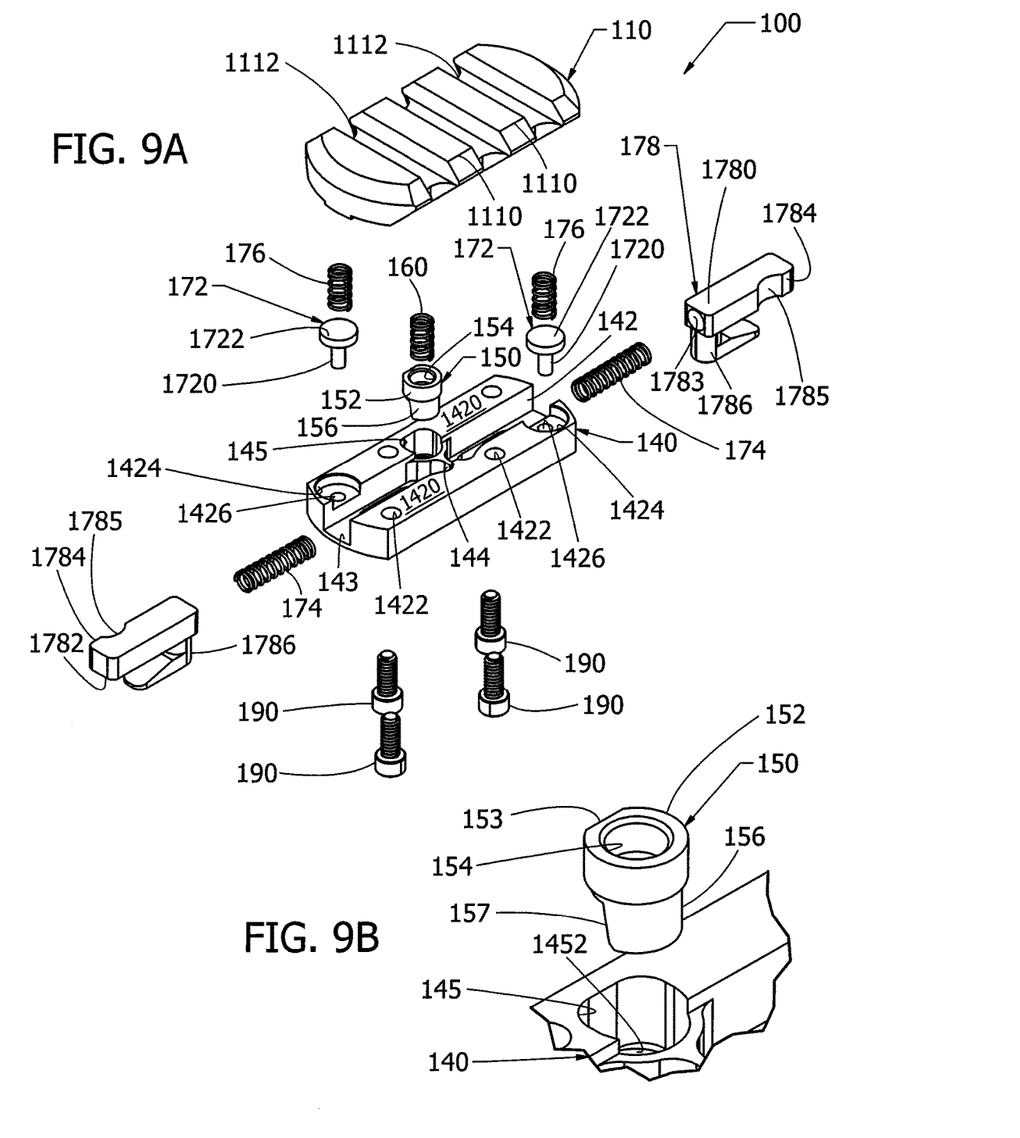
FIG. 9A is an exploded perspective view of the device of FIG. 3.
FIG. 9B is an exploded perspective view of the side wedge and a portion of the lower portion for receipt thereof.

As best shown in FIGS. 2-5, 7A, 7B and 8, lower portion 140 is preferably an elongated member comprised of a bottom portion 141, a pair of rails 142 extending upwardly from said bottom portion 141, a channel 143 and a block 144. More specifically, each of said rails 142 is spaced apart and generally parallel to the other of said rails 142 which, along with bottom portion 141, form channel 143, as best illustrated in FIGS. 8 and 9. Block 144 is preferably positioned within channel 143 at approximately the midpoint of channel 143, and attached to each of said rails 142 as described more fully below.

Each of said rails 142 further comprises a top 1420, one or more continuous fastener openings 1422 extending from said top 1420 through bottom portion 141 for receipt of a fastener 190, and a pin seat 1424, as best illustrated in FIGS. 8 and 9. Pin seat 1424 further comprises a continuous pin seat opening 1426 that extends from the top surface of pin seat 1424 through bottom portion 141, as described more fully below.

In a further preferred embodiment of the present invention, and as best illustrated in FIGS. 4, 5, 7A, 7B, 9 and 9A, device 100 preferably comprises a side wedge 150 and side wedge spring 160. Side wedge 150 is further comprised of a generally D-shaped head portion 152 and a smaller, generally D-Shaped body portion 156. D-shaped head portion 152 is further comprised of a generally flat face 153 and a spring seat 154, as best shown in FIG. 9A. Similarly, generally D-shaped body portion 156 is further comprised of an inclined face portion 157, which is preferably at an angle of between 5 and 15 degrees from the vertical plane (which is parallel to opening 18). In this preferred embodiment of the present invention, lower portion 140 is further comprised of a generally D-shaped side wedge opening 145 that extends from top 142 through bottom portion 141 for receipt of side wedge 150, and a side wedge seat 1452, as best shown in FIGS. 9 and 9A. The purpose and function of side wedge 150 and side wedge spring 160 is further described below.

As best shown in FIGS. 2-9A, device 100 is preferably also comprised of two locking mechanisms 170. Each of locking mechanisms 170 is preferably comprised of a releasing pin 170, a channel spring 174, a pin spring 176 and a wedge 178. Releasing pin 172 is further comprised of a body portion 1720 for insertion into pin seat opening 1426 and a head 1722. Head 1722 is shaped and sized to be capable of travelling in and out of pin seat 1424, as described more fully below.

As best illustrated in FIGS. 7A and 7B, channel spring 174 is an elongated spring that is positioned within channel 143 between block 144 and wedge 178 for applying biased tension against wedge 178, as described more fully below. Pin spring 176 is an elongated spring that is positioned between bottom 112 of upper portion 110 and head 1722 of releasing pin 172 for applying biased tension against releasing pin 172, as described more fully below.

Figure 5:
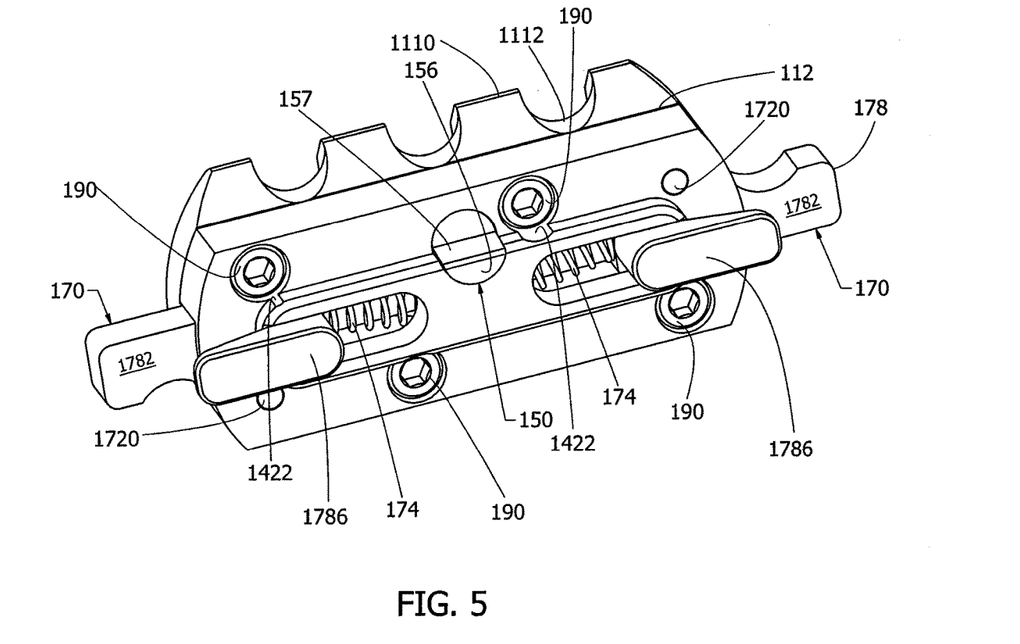
FIG. 5 is a bottom perspective view of the device of FIG. 4 in a locked position.

As best shown in FIGS. 5, 8 and 9, wedge 178 is preferably comprised of a top surface 1780, a bottom surface 1782, an inboard side 1784 with an indentation 1785 therein and a latch portion 1786. More specifically, latch portion 1786 extends downwardly and outwardly from bottom surface 1782 of wedge 178. Wedge 178 is positioned within channel 143 immediately adjacent channel spring 174 opposite of block 144. More specifically, channel spring 174 sits partially within a spring seat 1783 in wedge 178. As shown in FIGS. 7A, 7B, 8 and 9, in a preferred embodiment of the present invention, a second locking mechanism 170 is located in the opposite end of channel 143 on the other side of block 144 and functions in the same manner.

Figure 10A:
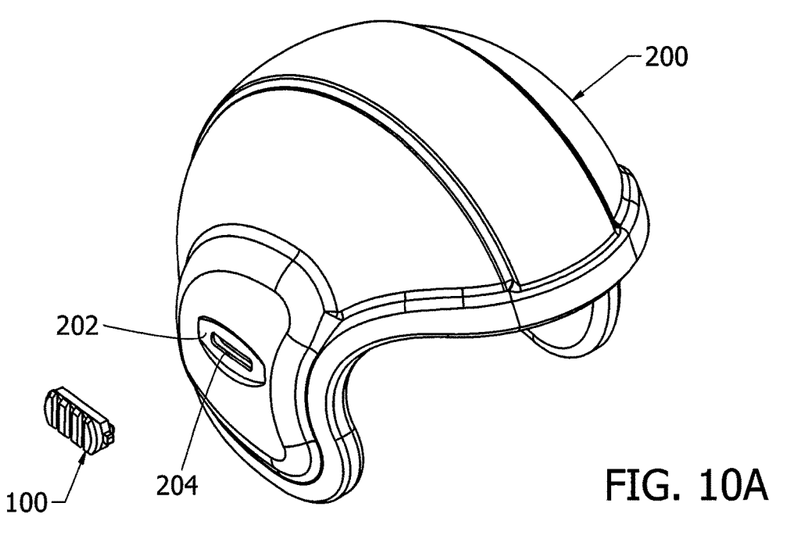
FIG. 10A is a perspective view of one embodiment of the device of the present invention, detached and spaced apart from a helmet.
Figure 10B:
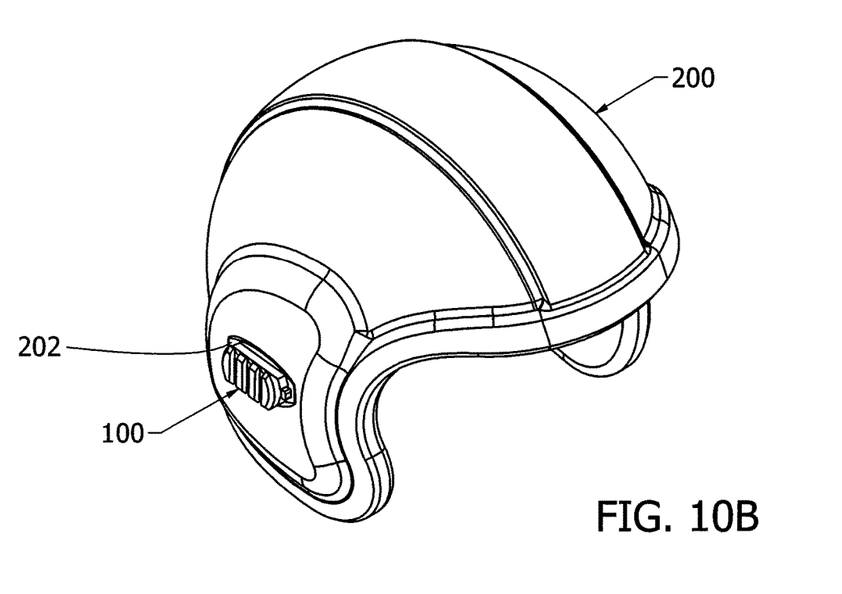
FIG. 10B is a perspective view of one embodiment of the device of the present invention attached to the side of a helmet.

As previously mentioned, device 100 may be attached to virtually any object 10 (e.g., helmets, bags, skateboards, skis, bicycles, clothing, parachute harnesses, vehicles, carriers, belts, etc.) that has an opening therein 16. By way of example, and without limitation, FIG. 10A is a perspective view of one embodiment of the device 100 of the present invention, detached and spaced apart from a helmet 200. Helmet 200 is comprised of an exterior surface 202 with an opening 204 therein for receipt of one or more of latch portions 1786. FIG. 10B is a perspective view of one embodiment of device 100 attached to the side of helmet 200 and ready to receive an accessory (not shown).

Figure 2:
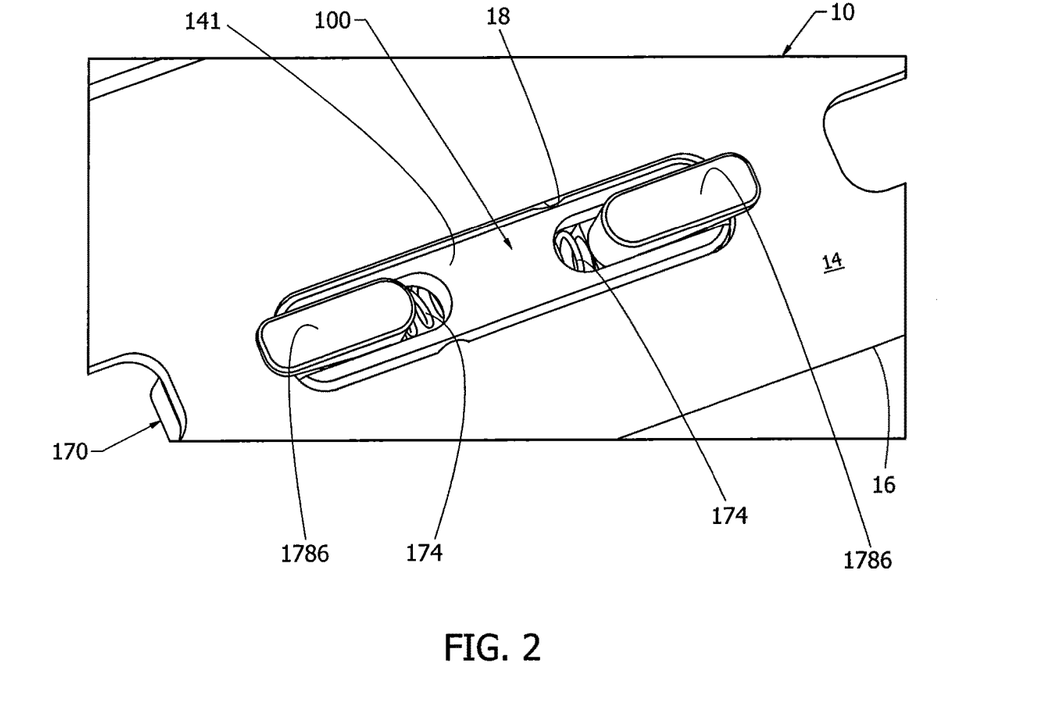
FIG. 2 is a bottom perspective view of one embodiment of the device of the present invention in a locked position and attached to an object.
Figure 3:
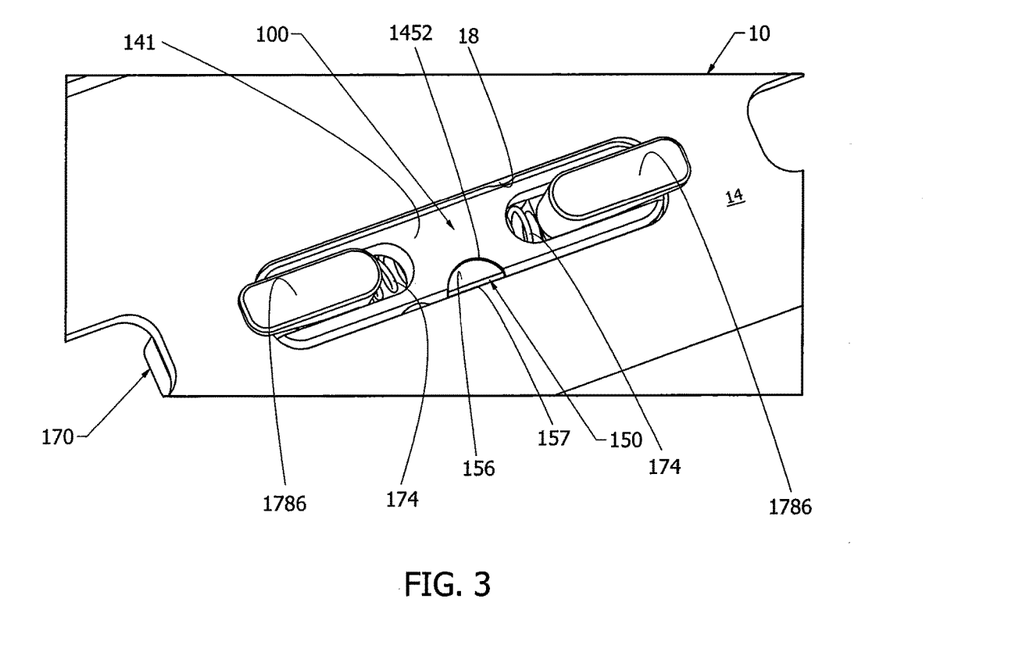
FIG. 3 is a bottom perspective view of an alternative embodiment of the device of the present invention with side wedge in a locked position and attached to an object.
Figure 4:
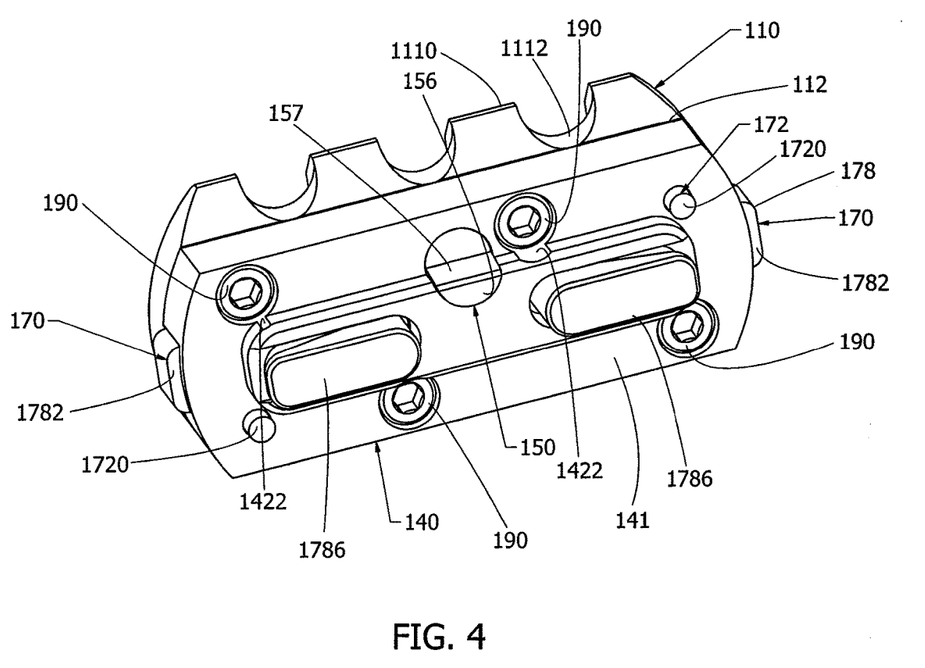
FIG. 4 is a bottom perspective view of the device of FIG. 3 in an unlocked position.

Having now described the general structure of a preferred embodiment of device 100, its function will now be described in general terms. FIG. 4 is a bottom perspective view of the device 100 of the present invention in an unlocked position. When device 100 is in an unlocked position, the biased tension of pin spring 176 on head 1722 causes a section of body portion 1720 of releasing pin 172 to extend outwardly from pin seat opening 1426 and bottom portion 141 of lower portion 140, as shown in FIG. 4. A user (not shown) desiring to securely attach improved mounting device 100 onto an object 10 (e.g., helmet 200) would simply place device 100 onto exterior surface 12 of object 10. As device 100 is placed onto exterior surface 12 of object 10, latch portion 1786 of wedge 178 passes through opening 15 of object 10, and releasing pin 172 compresses pin spring 176 against bottom 112 of upper portion 110. In an unlocked position, head 1722 of releasing pin 172 rests within pin seat 1424 adjacent to indentation 1785 on inboard side 1784 of wedge 178, and wedge 178 is compressing channel spring 174 against block 144. However, as pin spring 176 is compressed, head 1722 of releasing pin 172 leaves pin seat 1424 and clears the top 1420 of rail 142 thereby permitting the energy stored in channel spring 174 to be released against wedge 178 which, in turn causes wedge 178 to travel along channel 143 in a direction opposite of block 144 and for latch portion 1786 of wedge 178 to engage object 10, as best illustrated in FIG. 2. When latch portion 1786 of wedge 178 engages object 10, device 100 becomes securely and removably attached to object 10. FIG. 5 depicts a bottom perspective view of device 100 in the locked position.

In a further preferred embodiment of the present invention with a side wedge 150 and side wedge spring 160 installed thereon, as the user installs device 100 on object 10, the portion of body portion 156 that extends outwardly from side wedge opening 145 beyond bottom portion 141 comes into contact with object 10 and inclined face 157 comes into contact with the side of object opening 15 thereby causing side wedge spring 160 to partially compress and the incline of inclined face 157 applies pressure to object 10 thereby reducing the likelihood and amount of lateral movement of device 100 in relation to object 10.

When a user (not shown) desires to remove improved mounting device 100 from object 10, the user simply applies pressure to the end of wedge 178 extending beyond channel 143 in the direction of channel spring 174, thereby causing wedge 178 to travel along channel 143 and channel spring 174 to compress between wedge 178 and block 144. As wedge 178 travels along channel 143, latch portion 1786 of wedge 178 will disengage from object 10 and indentation 1785 in inboard side 1784 of wedge 178 will again align with pin seat 1424 to permit receipt of head 1722. Once aligned and capable of receiving head 1722 of releasing pin 172, the biased tension in pin spring 176 will cause head 1722 of releasing pin 172 to again be positioned within pin seat 1424 adjacent to indentation 1785 in inboard side 1784 of wedge 178. At this time, the unlocked device 100 can be removed from object 10, as best shown in FIG. 6. Further, as device 100 is removed, the energy stored in compressed side wedge spring 160 is released thereby causing body portion 156 of side wedge 150 to again extend outwardly from bottom portion 141 of lower portion 140.

Other variations are also within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for attaching an accessory to an object comprising:
    an upper portion;
    a lower portion comprised of a longitudinal channel and a block fixedly positioned in said longitudinal channel; and
    at least one locking mechanism for removably attaching said device to said object and comprising a releasing pin, a spring and a wedge, wherein said spring is positioned in said longitudinal channel between said block and said wedge for repositioning said wedge relative to said lower portion and further wherein said upper portion is removably but fixedly attached to a top surface of said lower portion with at least one fastener, and said releasing pin is adjacent to and interacts with a pin spring.

2. The device of claim 1 wherein said wedge further comprises a latch portion for engaging said object.

3. The device of claim 1 wherein a portion of said wedge extends outwardly from said longitudinal channel to engage an opening in said object.

4. The device of claim 1 further comprising a second locking mechanism comprised of a second spring and a second wedge, wherein said second spring is positioned in said longitudinal channel between said block and said second wedge, and further wherein said block is positioned between said spring and said second spring.

* * * * *